United States Patent [19]

Brackett et al.

[11] Patent Number: 4,866,699
[45] Date of Patent: Sep. 12, 1989

[54] OPTICAL TELECOMMUNICATIONS SYSTEM USING CODE DIVISION MULTIPLE ACCESS

[75] Inventors: Charles A. Brackett, Mendham; Jonathan P. Heritage, Red Bank; Jawad A. Salehi, Bedminster; Andrew M. Weiner, Eatontown, all of N.J.

[73] Assignee: Bell Communications Research, Inc., Livingston, N.J.

[21] Appl. No.: 65,023

[22] Filed: Jun. 22, 1987

[51] Int. Cl.⁴ ............................................. H04B 9/00
[52] U.S. Cl. ............................................ 370/3; 370/1; 455/607; 455/608; 455/611; 455/617; 340/825.52
[58] Field of Search ............................ 370/1, 2, 3, 23; 455/601, 608, 606, 607, 600, 611, 615, 617, 618, 619, 609; 340/825.52, 825.57; 350/96.13, 96.19

[56] References Cited

U.S. PATENT DOCUMENTS

| | | | |
|---|---|---|---|
| 3,160,711 | 12/1964 | Schroeder | 370/92 |
| 3,588,828 | 6/1971 | Schulein | 340/825.57 |
| 3,806,872 | 4/1974 | Odom | 340/825.57 |
| 3,873,825 | 3/1975 | Jones et al. | 370/1 |

FOREIGN PATENT DOCUMENTS 0995759  8/1976  Canada ............................ 455/609

OTHER PUBLICATIONS

P. W. Smith et al., "Mode Locking of Lasers", Progress in Quantum Electronics, vol. 3, pp. 143–174, Pergamon Press, New York, 1974.
D. J. Bradley, "Methods of Generation", *Ultrashort Light Pulses*, pp. 17–81, Springer-Verlag, 1984, Springer-Verlag, New York.
E. B. Treacy, "Optical Pulse Compression with Diffraction Gratings"IEEE J. Quantum Electronics, QE-5, No. 9, pp. 454–458, Sep. 1969.

Primary Examiner—Robert L. Griffin
Assistant Examiner—Andrew J. Telesz, Jr.
Attorney, Agent, or Firm—James W. Falk

[57] ABSTRACT

The present invention is an optical telecommunications system capable of setting up connections between particular pairs of subscriber stations. Illustratively, the Fourier components of radiation pulses produced in a first specific subscriber station are independently phase modulated in accordance with a predetermined code chosen so that the radiation pulse can be detected only in a second specific subscriber station.

11 Claims, 5 Drawing Sheets

OPTICAL TELECOMMUNICATIONS SYSTEM USING CODE DIVISION MULTIPLE ACCESS

FIELD OF THE INVENTION

This invention relates to an optical telecommunications network and more particularly to an optical telecommunications network using code division multiple access based on frequency domain coding and decoding of individual ultra-short light pulses.

BACKGROUND OF THE INVENTION

A typical communications network comprises a plurality of nodes or subscriber stations. Illustratively, such networks are arranged so that any given subscriber station can communicate selectively and exclusively with any other subscriber station or with a group of other subscriber stations.

As more advanced communications services such as enhanced video and interactive data communications become available, greater bandwidth is needed. Such bandwidth may be provided by implementing the network using optical technology including single mode optical fibers. In one type of optical network, a plurality of subscriber stations may be interconnected by means of a central hub switch. Each of the subscriber stations s connected to the hub switch by means of a bidirectional optical fiber link. However, in conventional optical fiber networks the hub switch itself is an electronic switch. Accordingly, information received by the hub switch from one of the subscriber stations must first undergo optical-to-electronic conversion. The converted electrical information is then electronically processed by the hub switch and converted back to optical form for transmission out of the hub switch to another of the subscriber stations.

One problem with this type of arrangement is that such electronic processing is limited in speed. A typical electronic gate can process information at a rate of up to about one gigabit per second. However, this is only a fraction of the bandwidth that can be provided using optical technology.

Accordingly, it is desirable to provide an all optical network which connects a plurality of subscriber stations. The all optical network should be arranged to provide simultaneous and exclusive message paths between subscriber pairs. An example of such an all optical network is disclosed in Cheung-Kobrinski-Loh U.S. patent application Ser. No. 948,244, entitled "Multi-Wavelength Optical Telecommunications System", filed Dec. 31, 1986, and now abandoned and assigned to the assignee hereof. The contents of this application are incorporated herein by reference.

This patent application describes a network in which each subscriber station has a transmitter capable of transmitting radiation at a unique wavelength associated with the particular station. Each station also has a receiver capable of receiving all of the wavelengths produced by the various transmitters in the network. A passive optical hub element is adapted to receive radiation over optical fiber links at a different wavelength from each of the transmitters and transmit over optical fiber links a fraction of the power received at each wavelength to all receivers. Thus, each subscriber station receives a fraction of the power transmitted by every other subscriber station. The receiver at each station is tunable to a given one of the wavelengths transmitted thereto so that communication between pairs of stations in the network can be achieved.

Another optical telecommunications network is disclosed in Chung-Kerner-O'Connor-Salehi-Wei U.S. patent application Ser. No. 923,332, entitled "Encoding and Decoding for Code Division Multiple Access Communication Systems", filed on Oct. 27, 1986 and now U.S. Pat. No. 4,779,266 issued Oct. 18, 1988 and assigned to the assignee hereof. The contents of this patent application are incorporated herein by reference. This patent application describes an optical network in which an optical pulse is transmitted to a selected one out of a plurality of potential receiving stations by coding the pulse in a manner so that it is detectable by the selected receiving station but not the other receiving stations. Such coding is accomplished by dividing each pulse into a plurality of intervals known as "chips". Each chip may take on the value logic "1" indicated by relatively large radiation intensity or the value logic "0" indicated by a relatively small radiation intensity. The chips comprising each pulse are coded with a particular pattern of logic "1"'s and logic "0"'s characteristic of the receiving station or stations to which it is to be transmitted. Each receiving station is provided with optical receiving equipment capable of regenerating an optical pulse when it receives a pattern of chips coded in accordance with its own unique sequence but cannot regenerate the pulse if the pulse is coded with a different sequence or code. A detailed discussion of the mathematical properties of the codes used in this network is provided in the patent application.

It is an object of the present invention to provide an alternative optical telecommunications system capable of supporting multiple simultaneous connections between subscriber pairs. In particular, mode locked lasers are capable of producing ultra-short pulses in which the phases of all of the Fourier components are coherently rather than randomly related. As shown below, phase coding of the Fourier components which comprise such optical pulses provide the basis of an inventive optical network in which one subscriber station can communicate selectively and exclusively with one or more other subscriber stations.

SUMMARY OF THE INVENTION

The present invention is an optical telecommunications network for interconnecting a plurality of subscriber stations. The network enables one subscriber station to selectively and exclusively communicate with one or more other subscriber stations. The inventive optical network utilizes code division multiple access based on optical frequency domain coding and decoding of ultra-short optical pulses.

Generally, each subscriber station comprises a transmitting system and a receiving system. Each of the transmitting systems includes an optical source for generating ultra-short optical pulses. The pulses comprise Fourier components whose phases are coherently related to one another. A signature is impressed upon an optical pulse by independently phase shifting the individual Fourier components comprising the pulse in accordance with a particular code. Each Fourier component comprising the pulse is phase shifted a different amount in accordance with the particular code. The encoded pulse is then broadcast to all or a plurality of the receiving systems in the network.

Each receiving system is characterized by a unique signature template or access code. Only those pulses provided with a signature to match a particular receiving system's template will be detected by that receiving system, all other pulses will be rejected. Each receiving system comprises a spectral modulator capable of separately phase shifting individual Fourier components comprising the radiation received by it. Typically, each of the Fourier components is phase shifted by a particular and individual amount. The sequence of phase shifts define a unique signature template or access code for each receiving system. For a particular transmitting system to communicate with a particular receiving system, the transmitting system must phase shift the Fourier components of the pulses generated therein equally and oppositely to the phase shifts introduced by the spectral modulator in the desired receiving system. In this case, the desired receiving system will detect the pulse, otherwise the pulse will not be detected by the desired receiving system. In other words, each receiving system has a "lock" defined by the phase shifts introduced by its spectral modulator. Each transmitting system encodes its pulses with a "key" which illustratively can open only one of the "locks" in the network.

More particularly, the transmitting system at each subscriber station employs a source for generating a sequence (not necessarily periodic) of ultra-short coherent optical pulses. One example of a source of coherent pulses is a mode locked laser. Each pulse represents one bit of information. Such optical pulses, wherein the phases of the Fourier components are related in a coherent manner, can be spectrally encoded with destination address information. The destination address information is encoded in the optical field spectral components. Illustratively, data information (as compared to address information can also be impressed on each pulse by on-off switching using an amplitude modulator.

To code the optical pulses generated therein with destination address or access code information, each transmitting system spatially separates the optical pulses into Fourier components. The Fourier components then pass through a phase mask. The phase mask may be fixed or state selectable. At each transmitter, the phase mask separately phase shifts each of the Fourier components with a predetermined phase shift so that the pulse is coded to match the access code of one of the receiving systems (in other words, the pulse is coded with a "key" capable of opening the "lock" in one receiving system). Thereafter, the Fourier components are combined spatially and broadcast via an optical fiber system to all of the receiving systems.

Each receiving system receives optical radiation from all or a plurality of the transmitting systems and spatially separates the received optical radiation into Fourier components. A phase mask (i.e., a spectral modulator) is utilized to introduce predetermined phase shifts for each of the received Fourier components, the sequence of phase shifts defining a unique access code. The received Fourier components are then recombined spatially. If the received radiation includes Fourier components that have been coded to match the access code of the particular receiving system (in other words, if Fourier components have been coded with the correct "key" capable of opening the particular receiving system "lock") a threshold detector will detect a pulse, otherwise no pulse will be detected. To view the system another way, a particular transmitting system can communicate with a particular receiving system if the phase mask in the receiving system is the phase conjugate of the phase mask in the transmitting system so that the transformation performed in the transmitting system is undone in the receiving system. In this manner, separate and exclusive connections between particular pairs of user stations may be established.

Thus, the present invention provides a multiplexing scheme that utilizes the fiber bandwidth to provide multiple access to an addressable receiver or receivers. The multiplexing scheme itself provides the addressability and an active central switch is not required.

DETAILED DESCRIPTION

Figure 1:
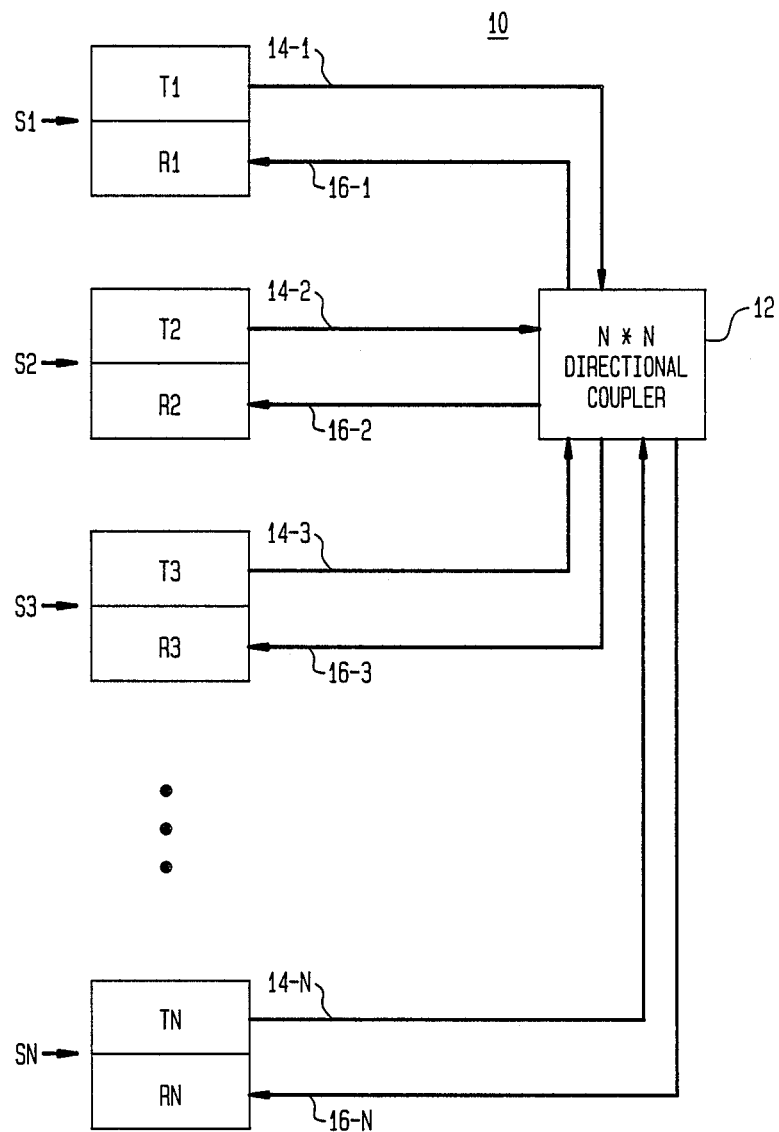
FIG. 1 is a schematic representation of an optical telecommunications network that enables simultaneous and exclusive communications between particular pairs of subscribe stations, in accordance with an illustrative embodiment of the invention.

Turning to FIG. 1, an optical telecommunications network designated by the numeral "10" is shown. The optical telecommunications network 10 provides communications among subscriber stations S1, S2, S3, ... SN. Each subscriber station S1, S2, S3, ... SN includes a transmitting system T1, T2, T3, ... TN, respectively. Each station S1, S2, S3, ... SN also includes a receiving system R1, R2, R3, ... RN, respectively. The network 10 also includes an NXN directional coupler 12. The directional coupler is preferably a passive element such as a conventional star coupler. The coupler 12 receives the optical power produced by each of the transmitting systems T1, T2, T3, ... TN via the fiber links 14-1, 14-2, ... 14-N, respectively. The coupler 12 transmits to each receiving system R1, R2, R3, ... RN via the fiber links 16-1, 16-2, 16-3, ... 16-N a fraction of the optical power produced by each transmitting system. However, as indicated below, each receiving system is "tuned" to detect information from only one transmitting system. In an alternative embodiment of the inventive network, some of the subscriber stations may have a receiving system but no transmitting system. An example of such a network is a network adapted to handle a broadcast or a multicast in which one transmitting system transmits information to a specially selected plurality of the receiving systems.

Figure 2:
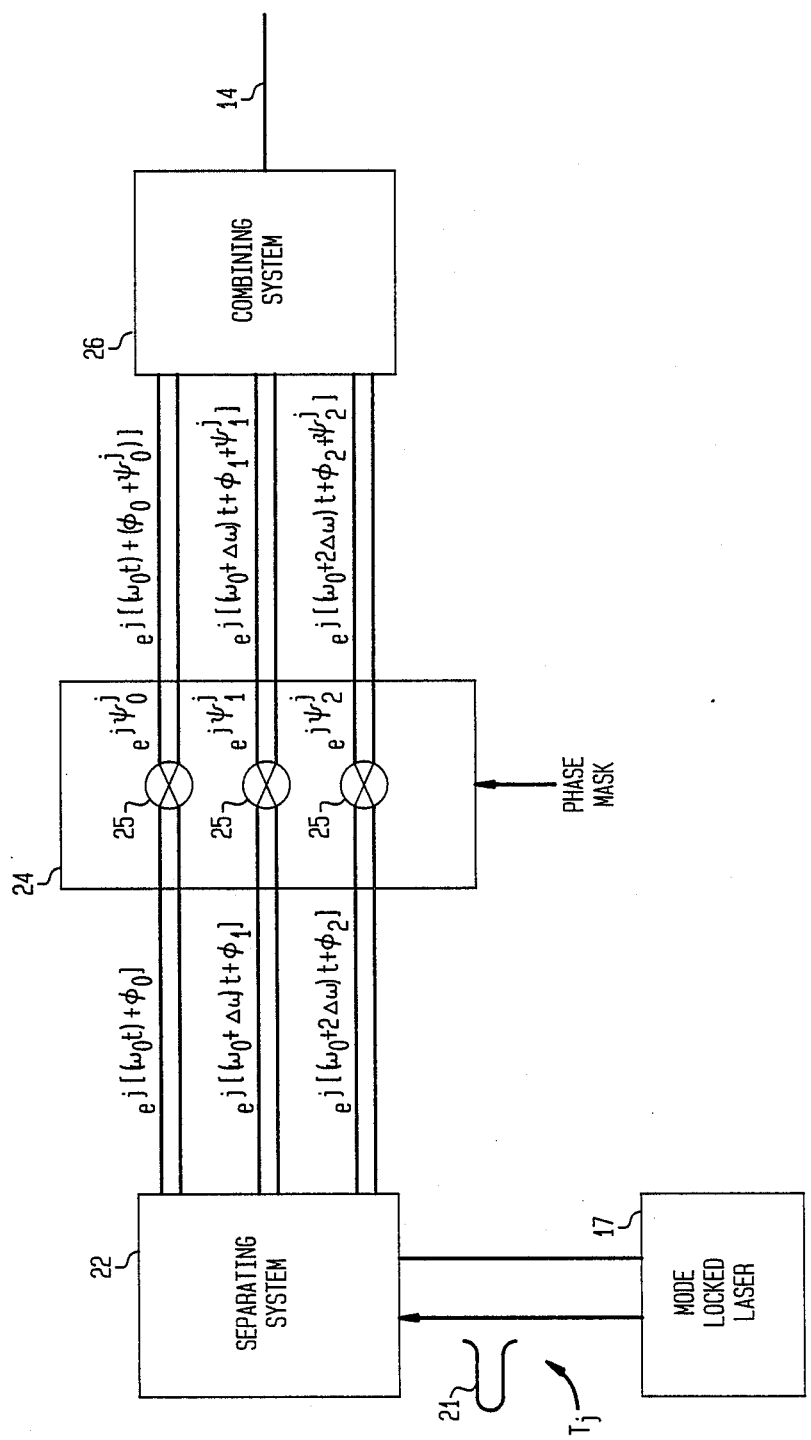
FIG. 2 is a block diagram of a transmitting system comprising part of the optical telecommunications network of FIG. 1.

FIG. 2 schematically illustrates a particular transmitting system Tj for use in the network 10. The optical pulses 21 are generated by the mode locked laser source 17. Each optical pulse 21 from the laser 17 is transmitted to a separating system 22 which spatially separates each optical pulse into its Fourier components. The Fourier components are then individually phase shifted by the phase mask 24 and then recombined using combining system 26 for transmission out over the optical fiber 14 to the receiving systems in the network.

The laser device 17 is capable of producing ultrashort optical pulses of about one picosecond in duration. These pulses are characterized in that the phases of the Fourier components comprising the pulses are coherently rather than randomly related. A mode locked laser is an example of a device which can produce such a pulse. Generally, the output signal from such a mode locked laser can be represented as follows:

$$e(t) = \sum_n E_n e^{j[(\omega_0 + n\Delta\omega)t + \phi_n]}$$

where the sum is over the n modes of the laser, $\omega_0$ is the frequency of the central mode and $\Delta\omega$ is the frequency separation between adjacent modes. $E_n$ is the amplitude (real) of the $n^{th}$ node and $\phi_n$ is the phase constant for the nth mode. In a preferred embodiment of the invention, the phase constant $\phi_n$ is zero for all modes.

Such mode locked lasers are discussed in P. W. Smith et al. "Mode Locking of Lasers" in Progress in Quantum Electronics Vol. 3, J. H. Sanders and S. Stenholm editors, Pergamon Press, N.Y. 1974 and D. J. Bradley "Methods of Generation" in Ultra-Short Light Pulses, S. L. Shapiro editor, Springer, Berlin 1984.

The separating system 22 and combining system 26 may be formed by way of a grating system. There are several types of grating systems which may be utilized. A configuration which comprises two parallel diffraction gratings (without lenses) and which contributes anomalous dispersion (i.e. will compress positively chirped pulses) is described in Heritage-Weiner, U.S. patent application Ser. No. 936,488 entitled "Apparatus for Stabilization of High Speed Optical Pulses", filed on Nov. 26, 1986 and now U.S. Pat. No. 4,746,193 issued May 24, 1988 and assigned to the assignee hereof. (See also E. B. Tracy "Optical Pulse Compression with Diffraction Gratings" IEEE J. Quantum Electronics QE-5 (1969) p. 454). When this system is utilized, one pass through the diffraction grating pair is used to separate the pulses into Fourier components, and after phase shifting, a second pass through the diffraction grating pair is used to recombine Fourier components. A configuration which is dispersion free and which may be used when the input pulses are unchirped is disclosed in C. Froehly et al "Shaping and Analysis of Picosecond Light Pulses" in Progress in Optics, E. Wolf, editor, Volume XX pp. 65-153, 1983, North Holland, Amsterdam 1983. This configuration comprises a pair of identical lenses separated by twice the focal length of the lenses and a pair of gratings, each grating being separated by a focal length from one of the lenses. In this case, one grating and lens is used to separate the pulses into Fourier components and the other grating and lens is used to recombine Fourier components after phase shifting. A further configuration is disclosed in O. E. Martinez "3000 Times Grating Compressor with Positive Group Velocity Dispersion: Application to Fiber Compensation in 1.3-1.6 µm Region" IEEE Journal of Quantum Electronics QE-23 (1987) 59. This configuration is the same as the Froehly configuration discussed above, but the gratings may be closer to the lenses for negative dispersion and further from the lenses for positive dispersion so that the configuration may be used for pulses with either sign of chirp. Additionally, lenses with different focal lengths may be used. A central point to note here, is that the grating and lens configuration should be arranged in a particular way according to the chirp (if any) of the input pulse to spatially separate the Fourier components of the pulse without producing the parabolic dependencies of phase retardation on frequency that a grating alone introduces.

Illustratively, in the transmitting system Tj of FIG. 2 the radiation from the laser 17 is shown as being separated into three Fourier components. The Fourier components are then projected onto a phase mask 24. The phase mask 24 is designed to independently phase shift the individual Fourier components by means of the individual phase shifters 25 in accordance with a predetermined code. Thus, each of the n Fourier components is phase shifted in the $j^{th}$ transmitting system by a particular amount $\psi_0^j, \psi_1^j, \psi_2^j \ldots \psi_n^j = \{\psi_n^j\}$. The particular sequence $\{\psi_n^j\}$ is chosen so that the pulses produced by the source 17 in the transmitting system Tj of FIG. 2 are detectable only by a selected one of the receiving systems R1, R2, ... RN. More particularly, as shown below, each of the receiving systems R1, R2, ... RN can be accessed only by pulses coded with a particular phase shift sequence which matches the access code of that particular receiving system. In other words, the phase shift sequence $\{\psi_n^j\}$ represents a "key" to open the "lock" to a particular receiving system.

After passing through the phase mask 24, the optical radiation can be represented mathematically as follows:

$$e'(t) = \sum_n E_n e^{j[(\omega_0 + n\Delta\omega)t + \phi_n + \psi_n^j]}$$

where e'(t) is the phase modulated signal produced by the phase mask 24 and $\psi_n^j$ is the relative phase shift introduced for the nth Fourier component by the phase mask 24.

After processing by the phase mask 24, the separate Fourier components are then combined together by means of the combining system 26 discussed above and transmitted over the fiber link 14 to the directional coupler 12 for distribution to all of the receiving systems R1, R2, R3, ... RN.

Figure 3:
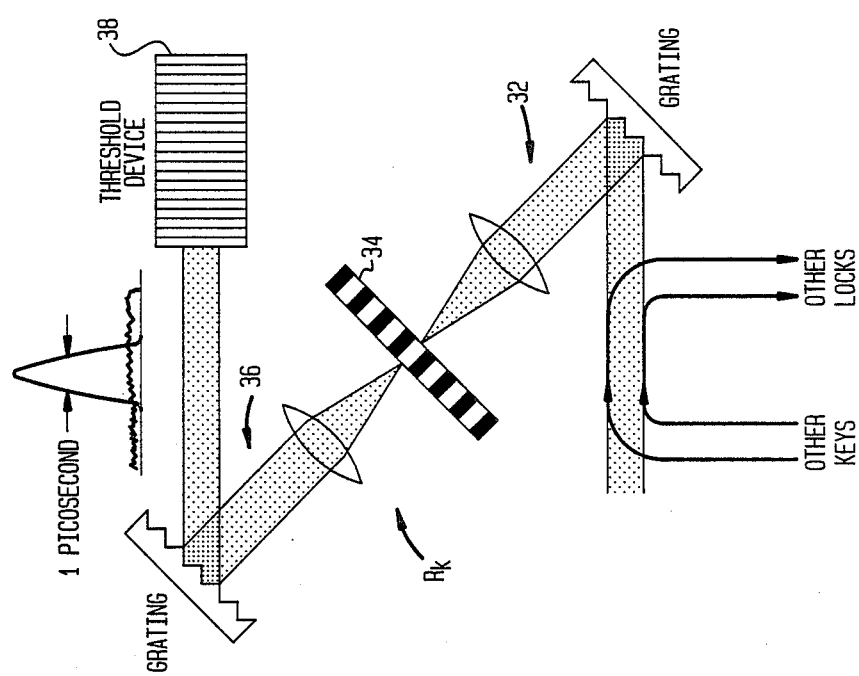
FIG. 3 is a schematic diagram which summarizes the operation of the transmitting system shown in FIG. 2.

The operation of a transmitting system Tj may summarized in connection with the schematic diagram of FIG. 3. The transmitting system Tj comprises a source 17 of picosecond or shorter pulses 21 whose Fourier components are coherently rather than randomly related. The Fourier components comprising the pulses are spatially separated using the grating and lens system 22. The individual Fourier components are then individually phase shifted in accordance with a predetermined code utilizing the phase mask 24. The individual Fourier components are then spatially recombined using lens and grating system 26. In this way an address or "key" is encoded into each pulse. Note that as a result of the coding the pulses are stretched in duration. For example, a one picosecond pulse may be stretched as a result of the coding so that it has a duration of 50 picoseconds.

Figure 4:
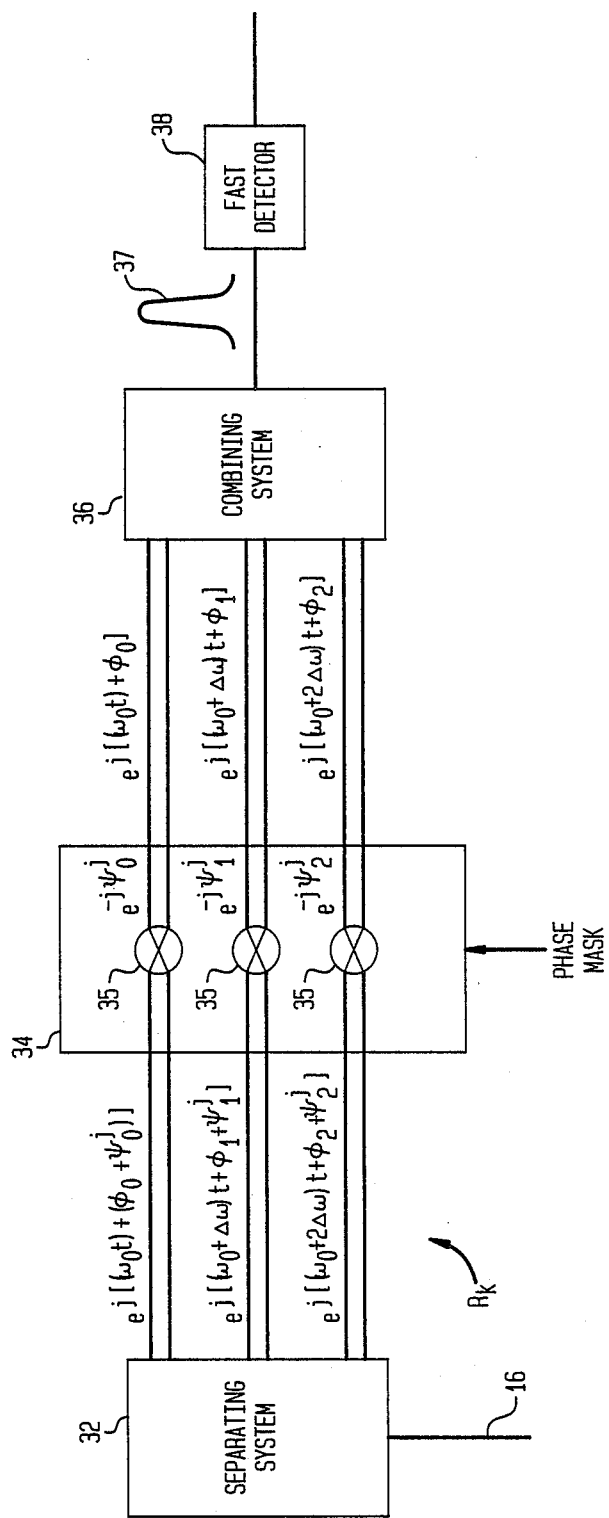
FIG. 4 is a block diagram of a receiving system comprising part of the optical telecommunications network of FIG. 1.

FIG. 4 shows a receiving system Rk intended to receive and detect the pulses produced by the transmitting system Tj shown in FIG. 2. In other words, the "lock" to the receiving system Rk of FIG. 3 can be opened with the "key" comprising the particular phase shift sequence $\{\psi_n^j\}$ used to encode the pulses produced in transmitting system Tj of FIG. 2. Pulses encoded with another phase shift sequence cannot be detected by the receiving system Rk of FIG. 3. The receiving system Rk in FIG. 3 receives the optical radiation from all of the transmitting systems T1, T2, T3, ... TN including the transmitting system Tj via optical fiber link 16.

A separating system 32 of the type described above is used to separate the received optical radiation into Fourier components. The Fourier components from the separating system 32 are processed by phase mask 34 which independently phase shifts the individual Fourier components using phase shifters 35. In particular, the $n^{th}$ Fourier mode is phase shifted by $\gamma_n^k$. The phase shift sequence $\gamma_0^k, \gamma_1^k \ldots \gamma_n^k = \{\gamma_n^k\}$ undoes the phase shifts introduce by the phase mask 24 of the transmitting system Tj of FIG. 2. Mathematically, the signal at the output of the phase mask 34 has the following general form:

$$e''(t) = \sum_{j=1}^{N} \sum_{n} E_n^j \exp j[(\omega_o + n\Delta\omega)t + \phi_n^j + \psi_n^j + \gamma_n^k]$$

where the sum j is over the N transmitting systems and the sum n is over the n Fourier modes.

For Fourier components arriving at receiving system Rk from transmitting system Tj, $\{\gamma_n^k\} = \{\psi_n^j\}$; (these Fourier components are shown in FIG. 4). The equality does not hold for Fourier components arriving at the receiving system Rk from other transmitting systems in the network. Thus, the phase mask 34 of FIG. 4 is the phase conjugate of the phase mask 24 of FIG. 2. After processing by the phase mask 34, the Fourier components from the transmitting system Tj of FIG. 2 are returned to their original form, i.e., the form they had before processing by the phase mask 24 of transmitting system Tj. Thus, when these Fourier components are recombined by the combining system 36 an ultra-short pulse 37 of high intensity is regenerated. Other Fourier components arriving from other transmitting stations are combined to produce more spreadout lower intensity pulses. The regenerated pulse 37 is of sufficient intensity to be detected by the threshold detector 38.

The threshold detector 38 must distinguish between a narrow ultra-short pulse and a more spread out lower intensity pulse. However, pulses in both classes will have the same energy and the detector 38 must act as fast as the time duration of the ultra-short pulse. Thus, the detector 38 may be implemented electronically using picosecond speed electronics or optically using fast nonlinear responding devices. One example of an optical threshold detector is based on second harmonic generation. Light incident on a nonlinear crystal (e.g. Lithium Iodate, $LiIO_3$) at frequency u produces output light at frequency $2\omega$ which is the second harmonic. More light at frequency $2\omega$ is produced by a short intense pulse than by a longer lower intensity pulse so that second harmonic generation can act as a threshold detector. See, e.g., E. P. Ippen & C. V. Shank "Techniques for Measurement" in Ultra-Short Light Pulses, S. L. Shapiro, editor, Springer Berlin, 1984, Chapter 3. A second type of optical threshold detector may be based on a fast optical bistable device, see Hyatt M. Gibbs, "Optical Bistability: Controlling Light with Light," Academic Press, 1985. A number of devices suitable for use in a threshold detector are discussed in this reference. A further type of bistable device with femtosecond response is reported in D. Hulin et al "Subpicosecond Optical Non-Linearities in GaAs Multiple-Quantum Well Structures" in Ultrafast Phenomena, G. R. Hemming and A. E. Siegman editors, Springer, Berlin, 1986.

Figure 5:
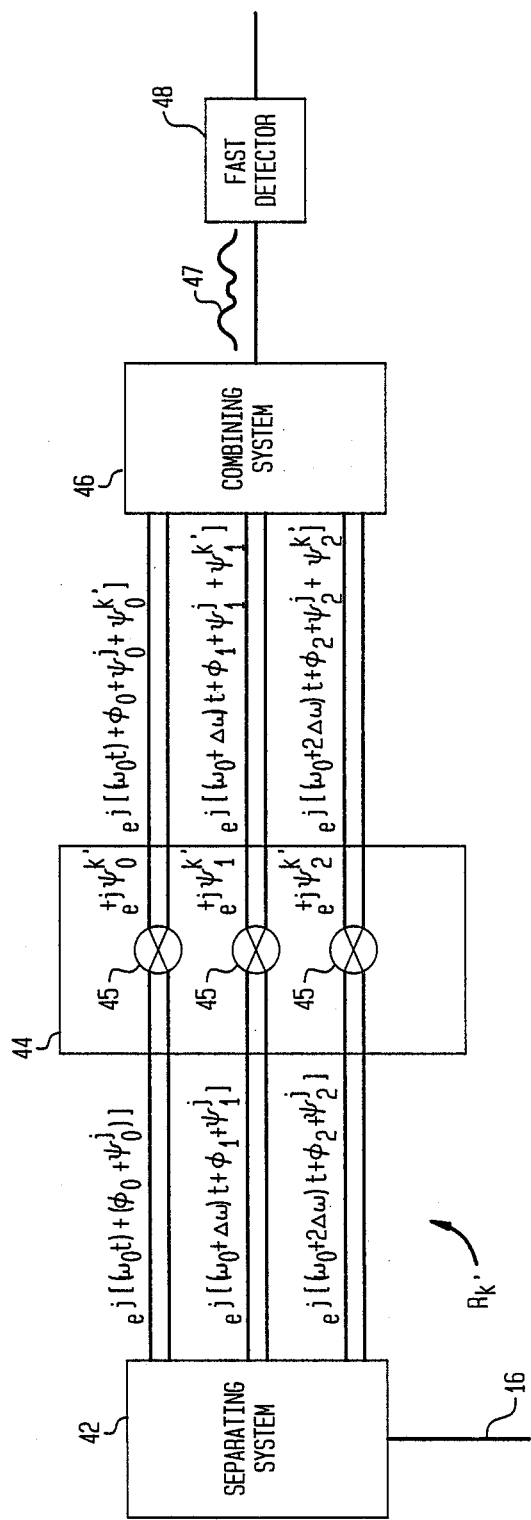
FIG. 5 is a block diagram of another receiving system comprising part of the optical telecommunications network of FIG. 1.

Referring to FIG. 5, there is shown a receiving system Rk' which is not intended to detect the optical pulses transmitted by the transmitting system Tj of FIG. 2. In other words, the "lock" to the receiving system Rk' cannot be "opened" using the "key" comprising the particular phase shift sequence $\{\psi_n^j\}$ used to encode 2. As in FIG. 4, the optical radii received by the receiving system Rk' from star coupler 12 via fiber link 16 is separated into Fourier components using the separating system 42. Thereafter, the Fourier components are processed by a phase mask 44 which utilizes phase shifters 45 to phase shift the individual Fourier components. The phase shift introduced by the phase shift mask 44 for the $n^{th}$ Fourier components is $\gamma_n^{k'}$. The sequence $\gamma_0^{k'}, \gamma_1^{k'}, \gamma_2^{k'} \ldots \gamma_n^{k'} = \{\gamma_n^{k'}\}$ defines an access code for the receiving system Rk' of FIG. 4. Because the phase mask 44 does not cancel the phase shifts introduced at the transmitting system Tj of FIG. 2, after recombination by the combining system 46, the Fourier components arriving at receiving system Rk' from transmitting system Tj (as shown in FIG. 5) do not recombine to produce a short high intensity optical pulse detectable by the threshold detector 48. Instead, relatively low intensity long duration pulses 47 are produced. The pulses 47 are not detected by the threshold detector 48. Thus, no connection is set up between transmitting system Tj of FIG. 2 and receiving system Rk' of FIG. 5.

Figure 6:
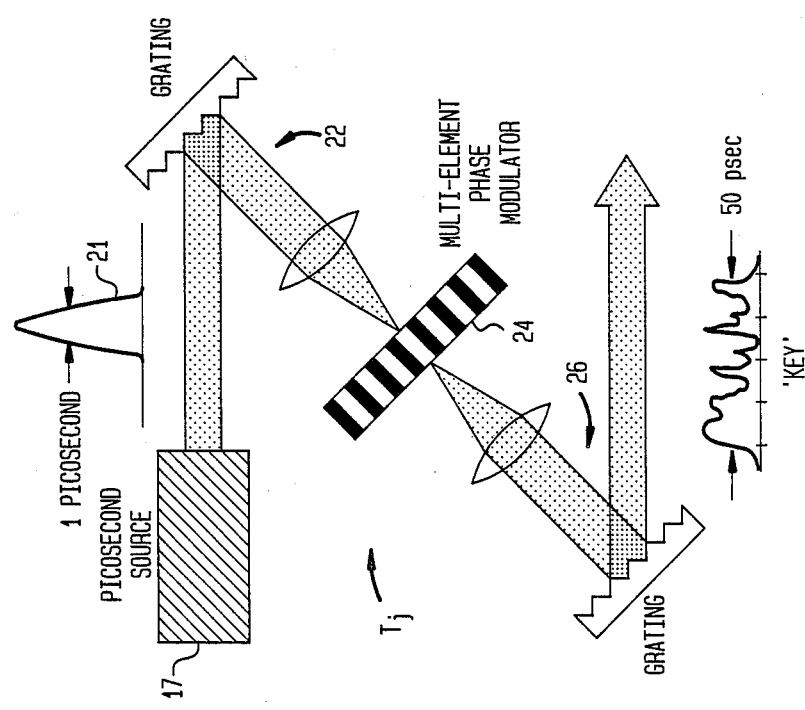
FIG. 6 is a schematic diagram which summarizes the operation of the receiving systems shown in FIGS. 4 and 5.

The operation of receiving system Rk may be summarized in connection with the schematic diagram of FIG. 6. Radiation from a plurality of transmitting stations is received at the receiver Rk and is broken into Fourier components by the lens-grating system 32. These Fourier components are then individually phase shifted by the phase mask 34, which phase mask 34 defines a "lock" for the receiving system Rk. The phase shifted Fourier components are then recombined using the lens-grating system 36. Fourier components encoded with the right "key" are recombined into a narrow pulse which is detected by the threshold detector 38. Fourier components encoded with other "keys" are recombined into a lower intensity more spread out pulse which is not detectable by the threshold detector 38.

In general, the $k^{th}$ receiving system has a phase mask which defines a unique phase shift sequence $\{\gamma_n^k\}$. In other words each of the sequences $\{\gamma_n^1\}, \{\gamma_n^2\}, \ldots \{\gamma_n^N\}$ defines a "lock" for the associated receiving system.

A particular transmitting system can communicate with a particular receiving system only by "opening" the "lock". For the $j^{th}$ transmitting system to communicate with the $k^{th}$ receiving system, the $j^{th}$ transmitting system must encode its pulses with the phase shift sequence $\{\psi_n^j\}$ where $\{\psi_n^j\} = \{-\gamma_n^k\}$. When a pulse is detected by an unintended receiving system cross modulation is said to take place. The code sequences $\{\psi_n^1\}, \{\psi_n^2\} \ldots \{\psi_n^N\}, \{\gamma_n^2\} \ldots \{\gamma_n^N\}$ are chosen to minimize cross modulation. An example of a code which tends to minimize cross modulation in the network of the present invention is a Quadratic Residue Code. This code is discussed in M. R. Schroeder Number Theory in Science and Communications, Springer, Berlin, 1986 pp. 173-175. An alternative code is the shifted M-sequence code discussed in R. C. Dixon Spread Spectrum Systems, John Wiley and Sons, 1984, N.Y. chapter 3.

Illustratively, each of the individual phase shifters 25, 35, 45 may be formed using an electro-optic material. Such a material has the property that its index of refraction (and the phase shift introduced in radiation propagating therein) may be varied by applying a voltage. Thus, specific connections in the network 10 of FIG. 1 may be set up or torn down by electrically controlling the phase shifts introduced by the phase shifters. In this regard, it should be noted that phases of the individual frequency components of the coded pulses are stationary throughout. This means that the spectral filter or phase mask that impresses the code upon the ultra-short pulse need only be required to change its state in the time interval between pulses and not within the time interval of the pulse itself. An acousto-optic modulator may also be used. Alternatively, fixed prefabricated phase-shifters can be made of fused silica using conventional microfabrication.

In short, an inventive telecommunications network, which provides selective and exclusive communication between pairs of user stations has been disclosed. Communication between pairs of user stations utilizes code division multiple access based on frequency domain coding and decoding of individual ultra-short pulses. While the network has been described above in connection with a central hub arrangement, the inventive network may also be implemented using a ring configuration in which individual stations put information on and remove information from a fiber optic ring by means of fiber taps. The inventive network may also be implemented using a tree configuration in which individual subscriber stations are connected to the branches of a fiber-optic "tree". In addition, while the inventive network has been described in connection with optical radiation, the use of code division multiple access based on frequency domain coding and decoding of individual pulses is applicable in other regions of the electromagnetic spectrum as well.

Finally, the above described embodiments of the invention are intended to be illustrative only. Numerous alternative embodiments may be devised by those skilled in the art, without departing from the spirit or scope of the following claims.

What is claimed is:

1. An optical telecommunications network comprising:
    a plurality of transmitting systems and a plurality of receiving systems,
    each of said transmitting systems comprising a source of optical pulses comprising Fourier components having a coherent phase relationship, means for spatially separating said optical pulses into said Fourier components, means for phase shifting each of said Fourier components in accordance with a predetermined code, and means for combining said phase shifted Fourier components for transmission to said plurality of receiving systems,
    each of said receiving systems being adapted to simultaneously receive radiation from said plurality of transmitting systems and comprising means for spatially separating said received radiation into Fourier components and means for eliminating phase shifts introduced in said Fourier components by one of said transmitting systems.

2. The network of claim 1, wherein said source of optical pulses is capable of generating picosecond or sub-picosecond pulses.

3. The network of claim 5 wherein said means at said transmitting systems for spatially separating said optical pulses into Fourier components is a grating system.

4. The network of claim 1 wherein said means at said transmitting systems for phase shifting comprises a phase mask.

5. The network of claim 4 wherein said combining means in said transmitting systems comprises a lens and grating system combining multiple outputs of said phase mask.

6. An optical telecommunications network comprising
    a plurality of transmitting systems; and
    a plurality of receiving systems,
    each of said transmitting systems comprising a source of optical radiation comprising a plurality of Fourier components having a coherent phase relationship and first phase shifting means for separately phase shifting said Fourier components of said optical radiation in accordance with a code chosen to access at least one of said receiving systems, and
    each of said receiving systems being adapted to receive optical radiation from at least some of said plurality of transmitting systems and comprising second phase shifting means for defining a characteristic access code, said second phase shifting means being adapted to phase shift Fourier components of said received radiation in accordance with said access code to enable the detection of radiation coded in said transmitting systems with a code corresponding to said characteristic code.

7. An optical telecommunications network comprising:
    a plurality of subscriber stations each comprising a transmitting system and a receiving system, said subscriber stations being interconnected by a fiber optic network,
    each of said receiving systems comprising means for separating incident radiation into Fourier components and phase shifting means for defining a characteristic access code, said phase shifting means being adapted to independently phase shift said Fourier components such that when said incident radiation is coded in a manner corresponding to said characteristic code, said phase shifted Fourier components are combinable to form a pulse of optical radiation, and
    each of said transmitting systems comprising a source of optical pulses, means for separating said pulses into Fourier components, and means for independently phase shifting said Fourier components to encode said pulses with a code capable of accessing one of said receiving stations.

8. An optical telecommunications network comprising
    a plurality of interconnected subscriber stations, said subscriber stations being inter-connected by optical fiber links and a passive star coupler so that a fraction of the optical power transmitted by each subscriber station is received at all subscriber stations,
    each of said subscriber stations including a transmitting system and a receiving system,
    each transmitting system comprising
    means for generating optical pulses comprising a plurality of Fourier components having a coherent phase relationship,
    means for spatially separating said optical pulses into said Fourier components, and
    means for introducing phase shifts into said Fourier components in accordance with a code chosen to enable said pulses to be detected by at least one of said receiving systems, each receiving system comprising:

means for separating incident radiation into Fourier components, means for separately phase shifting said Fourier components in accordance with a characteristic access code, means for combining said phase shifted Fourier components, and means for determining if said combined Fourier components form a optical pulse with a predetermined minimum intensity.

9. A method for optically communicating between a selected one of a group of transmitting systems and a selected one of a group of receiving systems comprising the steps of, at the selected transmitting system, phase shifting the Fourier components of an optical pulse to be transmitted ion accordance with a predetermined code and, at the selected receiving system, eliminating the phase shifts introduced in said Fourier components by the selected transmitting system, said Fourier components of said optical pulse having a coherent phase relationship.

10. A method for optically communicating between a selected one of a group of transmitting systems and a selected one of a group of receiving systems comprising the steps of:

at the selected transmitting system, spatially separating an optical pulse into Fourier components having a coherent phase relationship, phase shifting each of said Fourier components in accordance with a predetermined code sequence, and combining said phase modulated Fourier components for transmission to the receiving system, and at the selected receiving system, spatially separating the received radiation into Fourier components, and eliminating the phase shifts introduced into the Fourier components by the selected transmitting system.

11. A method in accordance with claim 10 further comprising, at said selected receiving system, the steps of combining the spatially separated Fourier components after elimination of the phase shifts into an optical pulse and producing an output signal if said optical pulse is above a threshold level of detection.

* * * * *

UNITED STATES PATENT AND TRADEMARK OFFICE
CERTIFICATE OF CORRECTION

PATENT NO. : 4,866,699

DATED : September 12, 1989

INVENTOR(S) : Charles A. Brackett, Jonathan P. Heritage, Jawad A. Salehi, and Andrew M. Weiner It is certified that error appears in the above-identified patent and that said Letters Patent is hereby corrected as shown below:

Column 1, line 28, "s" standing alone should read --is--.
Column 4, line 15, "subscribe" should read --subscriber--.
Column 7, line 8, after "shifts" insert "$\{\psi_n^j\}$";
          line 9, "introduce" should read --introduced--.
Column 8, line 4, "radii" should read --radiation--.
Column 9, line 66, "claim 5" should read "claim 1".
Column 11, line 20, "ion" should read --in--.

Signed and Sealed this

Twenty-sixth Day of April, 1994

*Attest:*

BRUCE LEHMAN

*Attesting Officer*  *Commissioner of Patents and Trademarks*